US009893595B2

(12) United States Patent
Murakami et al.

(10) Patent No.: US 9,893,595 B2
(45) Date of Patent: Feb. 13, 2018

(54) MOTOR WITH SPEED REDUCER PORTION INCLUDING A WORM AND BEING ACCOMMODATED WITH A CIRCUIT BOARD IN A HOUSING HAVING A HEAT-RECEIVING PORTION OVERLAPPING WITH THE WORM

(71) Applicant: ASMO CO., LTD., Kosai, Shizuoka-pref. (JP)

(72) Inventors: Seiichi Murakami, Hamamatsu (JP); Masumi Tsuchida, Toyokawa (JP); Kiyotaka Yamada, Kikugawa (JP)

(73) Assignee: ASMO CO., LTD., Kosai (JP)

( * ) Notice: Subject to any disclaimer, the term of this patent is extended or adjusted under 35 U.S.C. 154(b) by 111 days.

(21) Appl. No.: 14/447,625

(22) Filed: Jul. 31, 2014

(65) Prior Publication Data
US 2015/0042215 A1 Feb. 12, 2015

(30) Foreign Application Priority Data
Aug. 7, 2013 (JP) .................................. 2013-163901

(51) Int. Cl.
*H02K 11/00* (2016.01)
*H02K 9/22* (2006.01)
(Continued)

(52) U.S. Cl.
CPC ................ *H02K 9/22* (2013.01); *H02K 5/00* (2013.01); *H02K 7/1166* (2013.01); *H02K 11/38* (2016.01);
(Continued)

(58) Field of Classification Search
CPC .............. H02K 7/081; H02K 11/0068; H02K 11/0084; H02K 9/22; H02K 11/38;
(Continued)

(56) References Cited

U.S. PATENT DOCUMENTS 6,028,384 A * 2/2000 Billman ............. B60H 1/00835
251/129.11
8,201,478 B2 * 6/2012 Ramirez, Jr. ......... F16H 57/039
74/416
(Continued)

FOREIGN PATENT DOCUMENTS

CN      101410289 A    4/2009
DE      10153173 A1   10/2002
(Continued)

OTHER PUBLICATIONS

English language translation of the following: Office action dated Jun. 20, 2017 from the JPOA in a Japanese patent application No. 2016-200540 corresponding to the instant patent application. This office action translation is submitted now in order to supplement the understanding of the references being disclosed in the instant Information Disclosure Statement.
(Continued)

*Primary Examiner* — Bernard Rojas
*Assistant Examiner* — Maged Almawri
(74) *Attorney, Agent, or Firm* — SOLARIS Intellectual Property Group, PLLC

(57) ABSTRACT

A motor with a speed reducer, comprising a motor main body including a rotary shaft; a speed reducer portion including a worm and a worm wheel, a housing including a housing main body and a housing cover, the housing main body accommodating the speed reducer portion and being open to one side in an axial direction of the worm wheel; a circuit board accommodated in the housing, a power component disposed at one side of the circuit board; and a heat-receiving portion disposed at the housing main body, the heat-receiving portion being adjacent to the worm and disposed such that a part of the heat-receiving portion overlaps with the worm as viewed from the side thereof where the opening of the housing main body is disposed, and
(Continued)

the heat-receiving portion touching against a face at the other side of the circuit board and receiving heat generated by the power component.

13 Claims, 6 Drawing Sheets

(51) Int. Cl.
| | | |
|---|---|---|
| *H02K 5/00* | (2006.01) | |
| *H02K 11/38* | (2016.01) | |
| *H02K 5/18* | (2006.01) | |
| *H02K 11/30* | (2016.01) | |
| *H02K 11/33* | (2016.01) | |
| *H02K 7/116* | (2006.01) | |

(52) U.S. Cl.
CPC .............. *H02K 5/18* (2013.01); *H02K 7/116* (2013.01); *H02K 11/30* (2016.01); *H02K 11/33* (2016.01)

(58) Field of Classification Search
CPC ........ H02K 11/30; H02K 11/33; H02K 11/20; H02K 11/21; H02K 5/00; H02K 5/18; H02K 5/04; H02K 7/1166; H02K 7/116; H02K 7/10; H02K 9/00
USPC ..... 310/89, 64, 68 R, 75 R, 68 B, 83, 49.47, 310/19, 52
See application file for complete search history.

(56) References Cited

U.S. PATENT DOCUMENTS

| | | | | |
|---|---|---|---|---|
| 8,587,170 B2* | 11/2013 | Caliendo | ................ | H02K 7/116 310/68 B |
| 9,219,394 B2* | 12/2015 | Caliendo | ................ | H02K 7/116 |
| 2005/0223832 A1* | 10/2005 | Li | ........................ | H02K 7/1166 74/425 |
| 2006/0054451 A1* | 3/2006 | Klinke | ................... | A47B 21/06 192/223.4 |
| 2006/0181161 A1* | 8/2006 | Kawamoto | .......... | H02K 7/1166 310/51 |
| 2007/0040463 A1* | 2/2007 | Zorweg | .................... | H02K 5/04 310/83 |
| 2007/0069595 A1* | 3/2007 | Hiramatsu | ........... | H02K 7/1166 310/89 |
| 2009/0183940 A1* | 7/2009 | Sekine | ................. | B62D 5/0406 180/443 |
| 2009/0295258 A1* | 12/2009 | Caliendo | ................ | H02K 7/116 310/68 B |
| 2009/0295325 A1* | 12/2009 | Sekine | ................. | B62D 5/0406 318/646 |
| 2010/0320026 A1* | 12/2010 | Yoshida | ............... | B62D 5/0406 180/444 |
| 2014/0265738 A1* | 9/2014 | Anderson | .............. | H02K 7/116 310/60 R |
| 2015/0180305 A1* | 6/2015 | Okabe | .................. | H02K 7/1166 310/68 B |

FOREIGN PATENT DOCUMENTS

| | | |
|---|---|---|
| JP | 2004-159392 A | 6/2004 |
| JP | 2004-198940 A | 7/2004 |
| JP | 2007-097352 A | 4/2007 |

OTHER PUBLICATIONS

English language translation of the following: Office action dated Sep. 8, 2017 from the SIPO in a Chinese patent application corresponding to the instant patent application. This office action translation is submitted now in order to supplement the understanding of the cited references which are being disclosed in the instant Information Disclosure Statement.

* cited by examiner

MOTOR WITH SPEED REDUCER PORTION INCLUDING A WORM AND BEING ACCOMMODATED WITH A CIRCUIT BOARD IN A HOUSING HAVING A HEAT-RECEIVING PORTION OVERLAPPING WITH THE WORM

CROSS-REFERENCE TO RELATED APPLICATION

This application claims priority under 35 USC 119 from Japanese Patent Application, No. 2013-163901 filed Aug. 7, 2013, the disclosure of which is incorporated by reference herein.

BACKGROUND OF THE INVENTION

Technical Field

The present invention relates to a motor with a speed reducer.

Related Art

A motor unit recited in Japanese Patent Application Laid-Open (JP-A) No. 2004-159392 (a motor with a speed reducer) includes a bottom case. A circuit component accommodation section that accommodates circuit components is disposed on two levels, upper and lower, in the bottom case. A control circuit for controlling rotation of a motor shaft of the motor is accommodated at the lower side in the circuit component accommodation section, and a power circuit for controlling driving of the motor is accommodated at the upper side in the circuit component accommodation section. Power components (field effect transistors and the like) touch against a heat sink attached to the bottom case. Thus, heat generated by the power components is dissipated by the heat sink.

SUMMARY

However, the following problems arise in the motor unit described above. The circuit of the motor must be divided into two circuits, the control circuit and the power circuit, which leads to an increase in the number of components and an increase in the number of assembly steps.

Moreover, because the control circuit and the power circuit are disposed on the two upper and lower levels in the bottom case as described above, heat dissipation efficiency from the control circuit is poor. Furthermore, there is a concern that the control circuit components may be heated by heat generated by the power components.

Accordingly, structuring the circuit of the motor in a planar configuration that includes the control circuit and the power circuit can be considered. In this case, it is desirable to form a structure that both suppresses an increase in size of the motor unit and dissipates heat generated by the power components.

In consideration of the circumstances described above, the present invention provides a motor with a speed reducer that both suppresses an increase in size and dissipates heat well.

A motor with a speed reducer according to the present invention includes: a motor main body including a rotary shaft; a speed reducer portion including a worm that is provided at the rotary shaft and a worm wheel that meshes with the worm, the speed reducer portion reducing a rotation speed of the rotary shaft; a housing including a housing main body and a housing cover, the housing main body accommodating the speed reducer portion and being open to one side in an axial direction of the worm wheel, and the housing cover closing off an opening of the housing main body; a circuit board that is accommodated in the housing with a plate thickness direction of the circuit board in the axial direction of the worm wheel, a power component that controls driving of the motor main body being disposed at a face at one side of the circuit board; and a heat-receiving portion that is disposed at the housing main body, the heat-receiving portion being adjacent to the worm and disposed such that a part of the heat-receiving portion overlaps with the worm as viewed from the side thereof where the opening of the housing main body is disposed, and the heat-receiving portion touching against a face at the other side of the circuit board and receiving heat generated by the power component.

According to the motor with a speed reducer with the structure described above, the worm is provided at the rotary shaft of the motor main body, and the worm meshes with the worm wheel. The worm and the worm wheel are accommodated inside the housing main body. The housing main body is open to one side in the axial direction of the worm wheel, and the opening of the housing main body is covered by the housing cover. The circuit board is accommodated inside the housing with the plate thickness direction oriented to the axial direction of the worm wheel. The power component that controls driving of the motor main body is disposed at the face at the one side of the circuit board.

The heat-receiving portion is provided at the housing main body. The heat-receiving portion is disposed adjacent to the worm as viewed from the side thereof where the opening of the housing main body is disposed. The face at the other side of the circuit board touches against the heat-receiving portion. Thus, because the power component is disposed in correspondence with the heat-receiving portion, heat generated by the power component at the circuit board is received by the heat-receiving portion, and this heat may be transferred to the housing main body.

Herein, a part of the heat-receiving portion is disposed to overlap with the worm as viewed from the side thereof where the opening of the housing main body is disposed. Therefore, the area of the heat-receiving portion may be specified to be larger than in a comparative example in which no portion of the heat-receiving portion overlaps with the worm as viewed from the side thereof where the opening of the housing main body is disposed. That is, compared with the comparative example, a contact area between the heat-receiving portion and the circuit board may be made larger without the exterior of the housing main body becoming larger. Thus, while an increase in size of the housing main body may be suppressed, heat generated by the power component may be effectively received by the heat-receiving portion and the heat may be dissipated from the housing main body.

In a motor with a speed reducer according to the present invention, the power component is disposed to overlap with the heat-receiving portion as viewed from the side thereof where the opening of the housing main body is disposed.

According to the motor with a speed reducer with the structure described above, because the power component is disposed to overlap with the heat-receiving portion as viewed from the side thereof where the opening of the housing main body is disposed, heat generated by the power component may be transferred to the heat-receiving portion efficiently.

In a motor with a speed reducer according to the present invention, the housing main body is fabricated of metal and the heat-receiving portion is formed integrally with the housing main body.

According to the motor with a speed reducer with the structure described above, the housing main body is constituted of, for example, a metal material with high thermal conductivity. Thus, the heat received by the heat-receiving portion may be efficiently dissipated through the housing main body to the outer side of the housing main body.

In a motor with a speed reducer according to the present invention, the heat-receiving portion forms a flat surface that is parallel with the circuit board, and the flat surface opposes the face at the other side of the circuit board.

According to the motor with a speed reducer with the structure described above, power components that are disposed in a planar configuration at the face at the one side of the circuit board may easily be disposed to correspond with the heat-receiving portion.

In a motor with a speed reducer according to the present invention, a heat dissipation fin is formed integrally at an outer surface portion of the housing main body, at a position that corresponds with the heat-receiving portion.

According to the motor with a speed reducer with the structure described above, the heat transferred from the heat-receiving portion to the housing main body may be efficiently dissipated to the outer side of the housing main body by the heat dissipation fin.

In a motor with a speed reducer according to the present invention, a heat dissipation block is formed integrally at the housing main body, the heat dissipation block being disposed at the opposite side from a side of the worm where the worm wheel is disposed, as viewed from the side thereof where the opening of the housing main body is disposed, and a surface of the heat dissipation block at the side thereof where the opening of the housing main body is disposed structures a part of the heat-receiving portion.

According to the motor with a speed reducer with the structure described above, the heat dissipation block is integrally formed at the housing main body. The heat dissipation block is disposed at the opposite side from the side of the worm where the worm wheel is disposed, as viewed from the side thereof where the opening of the housing main body is disposed, and structures a part of the heat-receiving portion. Thus, the heat dissipation block may be formed to effectively utilize dead space in the housing main body.

In a motor with a speed reducer according to the present invention, an overhang portion is formed at the heat dissipation block, at a position thereof where the opening of the housing main body is disposed relative to the worm, the overhang portion protrudes toward the worm, and surfaces of the heat dissipation block and the overhang portion at the side thereof where the opening of the housing main body is disposed are formed to be coplanar and structure the heat-receiving portion.

According to the motor with a speed reducer with the structure described above, the overhang portion is formed at the heat dissipation block. The overhang portion is disposed at the side of the heat dissipation block where the opening of the housing main body is disposed relative to the worm, and protrudes from the heat dissipation block toward the worm. The surfaces of the heat dissipation block and the overhang portion at the side thereof where the opening of the housing main body is disposed are formed to be coplanar, and this surface serves as the heat-receiving portion. Thus, the heat dissipation block and overhang portion may be formed to effectively utilize dead space in the housing main body, and a heat-receiving portion with a relatively large surface area may be formed at the heat dissipation block and the overhang portion.

In a motor with a speed reducer according to the present invention, the overhang portion of the heat dissipation block overlaps with a portion of the worm as viewed from the side thereof where the opening of the housing main body is disposed.

According to the motor with a speed reducer with the structure described above, the overhang portion of the heat dissipation block overlaps with a portion of the worm as viewed from the side thereof where the opening of the housing main body is disposed. Thus, the overhang portion may be provided at the heat dissipation block and the surface area of the heat dissipation block is made larger without the exterior of the housing main body becoming larger.

In a motor with a speed reducer according to the present invention, a plural number of recess portions are provided from the outer surface portion of the housing main body to the interior of the heat dissipation block, and the heat dissipation fins are formed adjacent to the recess portions, respectively.

According to the motor with a speed reducer with the structure described above, the plural recess portions are formed in the outer surface portion of the housing main body, and the heat dissipation fins are formed adjacent to the recess portions, respectively. Therefore, the heat dissipation fins may be formed with a relatively large surface area while protrusion of the heat dissipation fins from the outer surface portion of the housing main body is suppressed. Thus, heat transferred to the housing main body may be dissipated from the heat dissipation fins while an increase in size of the housing main body may be suppressed.

In a motor with a speed reducer according to the present invention, the face at the other side of the circuit board and the heat-receiving portion touch via a thermally conductive material with viscosity.

According to the motor with a speed reducer with the structure described above, because the thermally conductive material with viscosity is interposed between the face at the other side of the circuit board and the heat-receiving portion, the face at the other side of the circuit board and the heat-receiving portion may be put into area contact over the shape of a contact region therebetween. Thus, the efficiency of heat conduction from the circuit board to the heat-receiving portion may be further improved.

A motor with a speed reducer according to the present invention includes: a motor main body including a rotary shaft; a speed reducer portion including a worm that is provided at the rotary shaft and a worm wheel that meshes with the worm, the speed reducer portion reducing a rotation speed of the rotary shaft; a housing including a housing main body and a housing cover, the housing main body accommodating the speed reducer portion and being open to one side in an axial direction of the worm wheel, and the housing cover closing off an opening of the housing main body; a circuit board that is accommodated in the housing with a plate thickness direction of the circuit board in the axial direction of the worm wheel, a power component that controls driving of the motor main body being disposed at a face at one side of the circuit board; a heat dissipation block that is formed integrally at the housing main body, the heat dissipation block being disposed at the opposite side of a side of the worm where the worm wheel is disposed and being disposed to overlap with the power component, as viewed from the side thereof where the housing main body is disposed, and the heat dissipation block touching against a face at the other side of the circuit board and receiving heat generated by the power component; a plural number of recess portions that are formed at a region of an outer surface portion of the housing main body that corresponds with the heat dissipation block, the recess portions being recessed from the outer surface portion of the housing main body to the interior of the heat dissipation block; and a heat dissipation fin that is formed at the outer surface portion of the housing main body, the heat dissipation fin being formed adjacent to the recess portions.

According to the motor with a speed reducer with the structure described above, the worm of the speed reducer portion is provided at the rotary shaft of the motor main body, and the worm meshes with the worm wheel of the speed reducer portion. The worm and the worm wheel are accommodated inside the housing main body. The housing main body is open to one side in the axial direction of the worm wheel, and the opening of the housing main body is covered by the housing cover. The circuit board is accommodated inside the housing with the plate thickness direction thereof oriented to the axial direction of the worm wheel. The power component that controls driving of the motor main body is disposed at the face at one side of the circuit board.

The heat dissipation block is integrally formed at the housing main body. The heat dissipation block is disposed at the opposite side from the side of the worm where the worm wheel is disposed and overlaps with the power component, as viewed from the side thereof where the opening of the housing main body is disposed. The face at the other side of the circuit board touches against the heat dissipation block, and heat generated by the power component is received by the heat dissipation block. Thus, the heat generated by the power component may be transferred to the outer side of the housing main body.

The recess portions are formed at a region of the outer surface portion of the housing main body that corresponds with the heat dissipation block. These recess portions are recessed from the outer side portion of the housing main body toward the interior of the heat dissipation block. The heat dissipation fin is formed adjacent to the recess portions at the outer surface portion of the housing main body. Therefore, a proximal end portion of the heat dissipation fin is formed to be disposed in the interior of the heat dissipation block. Thus, the heat dissipation fin may be formed with a relatively large surface area while protrusion of the heat dissipation fin from the outer surface portion of the housing main body may be suppressed. As a result, heat transferred to the housing main body may be dissipated from the heat dissipation fin while an increase in size of the housing main body may be suppressed.

BRIEF DESCRIPTION OF THE DRAWINGS

Embodiments of the present invention will be described in detail based on the following figures, wherein.

DETAILED DESCRIPTION OF THE INVENTION

Figure 2:
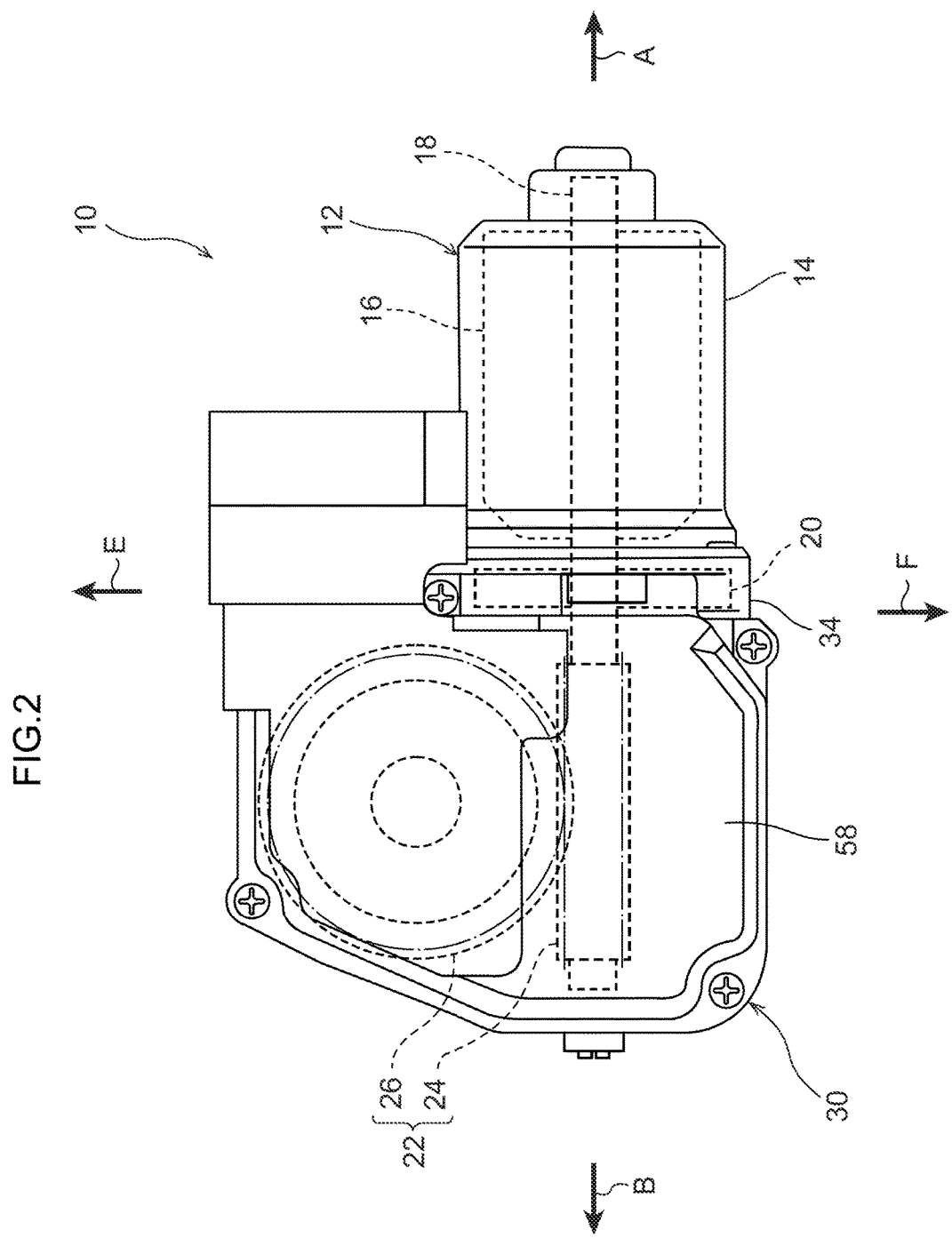
FIG. 2 is a plan view showing the whole of the motor with a speed reducer that is shown in FIG. 1, viewed from an upper side.

Herebelow, a motor with a speed reducer 10 according to a present exemplary embodiment is described using the attached drawings. The motor with a speed reducer 10 is used as a drive source for a wiper device (not shown in the drawings) of a vehicle (an automobile). As shown in FIG. 2, the motor with a speed reducer 10 includes a motor main body 12, a speed reducer portion 22 and a housing 30. The speed reducer portion 22 is for gearing down rotation of the motor main body 12. The housing 30 accommodates a circuit board 60, which is for driving and controlling the motor main body 12 (see FIG. 3), and the speed reducer portion 22.

The motor main body 12 has the configuration of a "brushed DC motor". The motor main body 12 is provided with a motor yoke 14 substantially in the shape of a tube with a floor. A plural number of permanent magnets (not shown in the drawings) are fixed to an inner periphery face of the motor yoke 14. The permanent magnets are disposed such that the magnetic poles thereof alternate in the circumferential direction of the motor yoke 14.

An armature 16 is turnably accommodated in the motor yoke 14, at the inner side relative to the permanent magnets. The armature 16 includes a rotary shaft 18. The rotary shaft 18 is formed in a substantially circular rod shape, and is disposed to be coaxial with the motor yoke 14. One end portion in an axial direction of the rotary shaft 18 (the end portion at the side in the direction of arrow A in FIG. 2) is turnably supported at the floor portion of the motor yoke 14 via a bearing (not shown in the drawings). The other end portion in the axial direction of the rotary shaft 18 (the end portion at the side in the direction of arrow B in FIG. 2) is disposed inside the housing 30, which is described below, and is turnably supported at a gear housing 32 that structures the housing 30. A worm 24 is integrally formed at a portion at the other end side in the axial direction of the rotary shaft 18. The worm 24 structures the speed reducer portion 22. A worm gear 24A is formed at the outer periphery of the worm 24 (see FIG. 5).

The motor main body 12 is also provided with a brush holder apparatus 20. The brush holder apparatus 20 is formed in a substantially annular shape and is disposed at the radial direction outer side of the rotary shaft 18, at a middle portion in the axial direction of the rotary shaft 18. The brush holder apparatus 20 is provided with a plural number of brushes (not shown in the drawings). The brushes are slidably abutted against a commutator (not shown in the drawings) of the armature 16.

Figure 4:
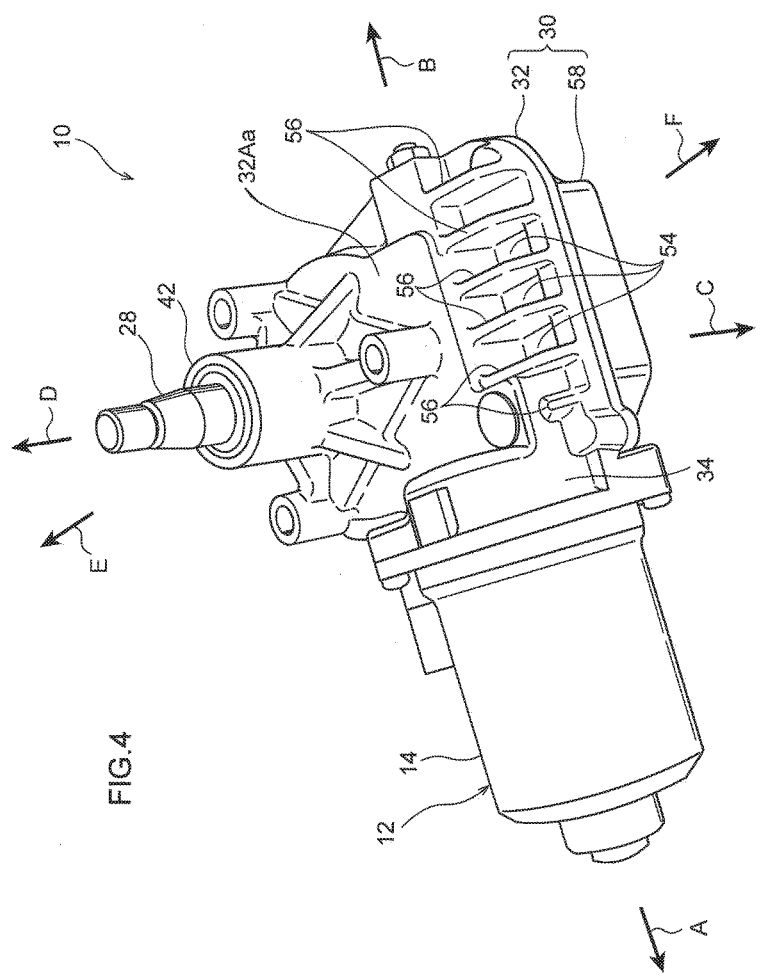
FIG. 4 is a perspective view showing the whole of the motor with a speed reducer that is shown in FIG. 2, viewed from the lower side (a side at which a gear housing is disposed)

As shown in FIG. 4, the housing 30 is formed in a substantial box shape, and is disposed at the other side in the axial direction of the rotary shaft 18 relative to the motor yoke 14 (the side of an opening portion of the motor yoke 14, which is to say the side in the direction of arrow B in FIG. 4). The housing 30 is structured to be divided in an up-and-down direction. That is, the housing 30 includes the gear housing 32 and a cover plate 58. The gear housing 32 serves as a housing main body that structures a portion at the lower side of the housing 30 (the side in the direction of arrow D in FIG. 4). The cover plate 58 serves as a housing cover that structures a portion at the upper side of the housing 30 (the side in the direction of arrow C in FIG. 4).

Figure 6:
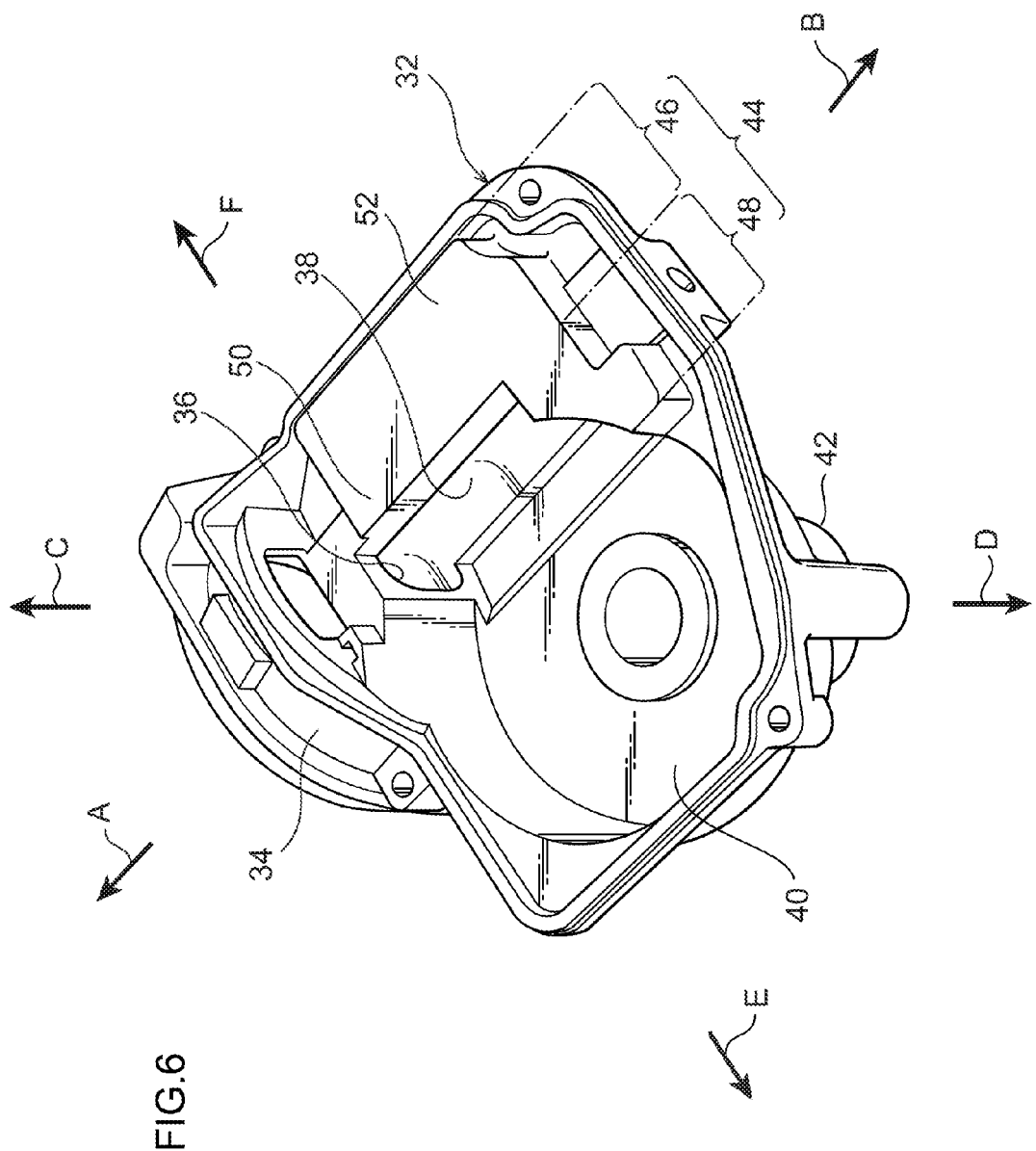
FIG. 6 is a perspective view showing the gear housing, which is shown in FIG. 1.

As shown in FIG. 6, the gear housing 32 is fabricated of aluminum (or an aluminum alloy) by die-cast molding or the like. The gear housing 32 is formed overall in a substantial box shape that is open to the upper side in a direction orthogonal to the rotary shaft 18 (to the side in the direction of arrow C in FIG. 6). A holder accommodation portion 34 is formed integrally at the gear housing 32. The holder accommodation portion 34 is for accommodating and supporting the above-mentioned brush holder apparatus 20 of the motor main body 12. The holder accommodation portion 34 is disposed at a position that corresponds with the opening portion of the motor yoke 14, and is formed substantially in the shape of a tube with a floor that is open toward the one side in the axial direction of the rotary shaft 18 (the side in the direction of arrow A in FIG. 6). The holder accommodation portion 34 is fixed at the opening portion of the motor yoke 14. Thus, the holder accommodation portion 34 closes off the opening portion of the motor yoke 14 (see FIG. 2 to FIG. 4). An insertion hole 36 in a substantially rectangular shape is formed penetrating through the floor wall of the holder accommodation portion 34 in the axial direction of the rotary shaft 18. The rotary shaft 18 is inserted into the insertion hole 36 (see FIG. 1) from the side thereof at which the holder accommodation portion 34 is disposed (the side at which the motor yoke 14 is disposed).

A worm accommodation portion 38, for accommodating the worm 24 of the rotary shaft 18, is formed in the gear housing 32. The worm accommodation portion 38 is disposed at the other side in the axial direction of the rotary shaft 18 (the side in the direction of arrow B in FIG. 6) relative to the holder accommodation portion 34, and the worm accommodation portion 38 is formed along the axial direction of the rotary shaft 18. The insertion hole 36 communicates between the interior of the worm accommodation portion 38 and the interior of the holder accommodation portion 34. Accordingly, when the rotary shaft 18 is being accommodated into the worm accommodation portion 38, the rotary shaft 18 is inserted from the one side in the axial direction thereof into the insertion hole 36 and accommodated into the worm accommodation portion 38.

A worm wheel accommodation portion 40 is also formed in the gear housing 32. As viewed from the side at which the opening of the gear housing 32 is disposed (hereinafter described simply as the opening side of the gear housing 32), the worm wheel accommodation portion 40 is disposed adjacent to a side of the worm accommodation portion 38 (one side in a directional orthogonal to the rotary shaft 18; the side in the direction of arrow E in FIG. 6). The worm wheel accommodation portion 40 is formed as a recess, with a substantially circular shape in cross section, that is open to the upper side. The interior of the worm wheel accommodation portion 40 and the interior of the worm accommodation portion 38 are in communication with one another.

Figure 1:
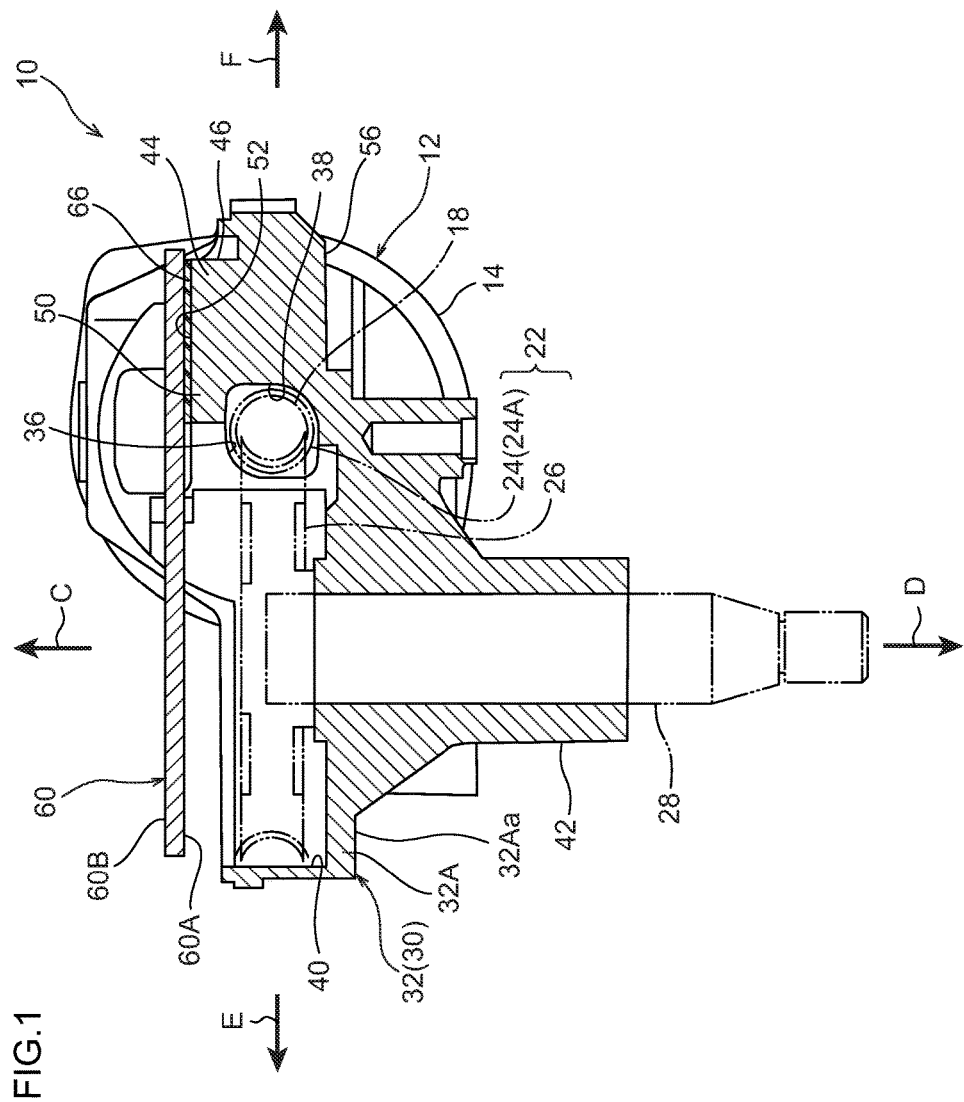
FIG. 1 is a sectional diagram (a sectional diagram taken along line 1-1 of FIG. 3) of a motor with a speed reducer in accordance with a present exemplary embodiment, viewed in the axial direction of a rotary shaft, showing a state in which a cover plate has been removed.

A worm wheel 26 in a substantial disc shape (see FIG. 5) is accommodated in the worm wheel accommodation portion 40. The worm wheel 26 structures the speed reducer portion 22. As shown in FIG. 1, the worm wheel 26 is disposed coaxially with the worm wheel accommodation portion 40. One side in an axial direction of the worm wheel 26 (the side in the direction of arrow C in FIG. 1) is in line with the upper side of the gear housing 32. A substantially circular rod-shaped output shaft 28 is provided at an axial center portion of the worm wheel 26. The output shaft 28 protrudes from the worm wheel 26 to the other side in the axial direction of the worm wheel 26 (the side in the direction of arrow D in FIG. 1). The output shaft 28 is disposed coaxially with the interior of a tube portion 42 with a substantially circular tube shape that is formed at a floor wall 32A of the gear housing 32. The output shaft 28 is turnably supported inside the tube portion 42. The output shaft 28 is coupled for driving with a pivot shaft (not shown in the drawings) that structures the wiper device of the vehicle, via a linking mechanism or the like. An outer periphery portion of the worm wheel 26 meshes with the worm 24 of the rotary shaft 18. Thus, when the rotary shaft 18 is rotated, the output shaft 28 is rotated at a reduced speed.

Figure 5:
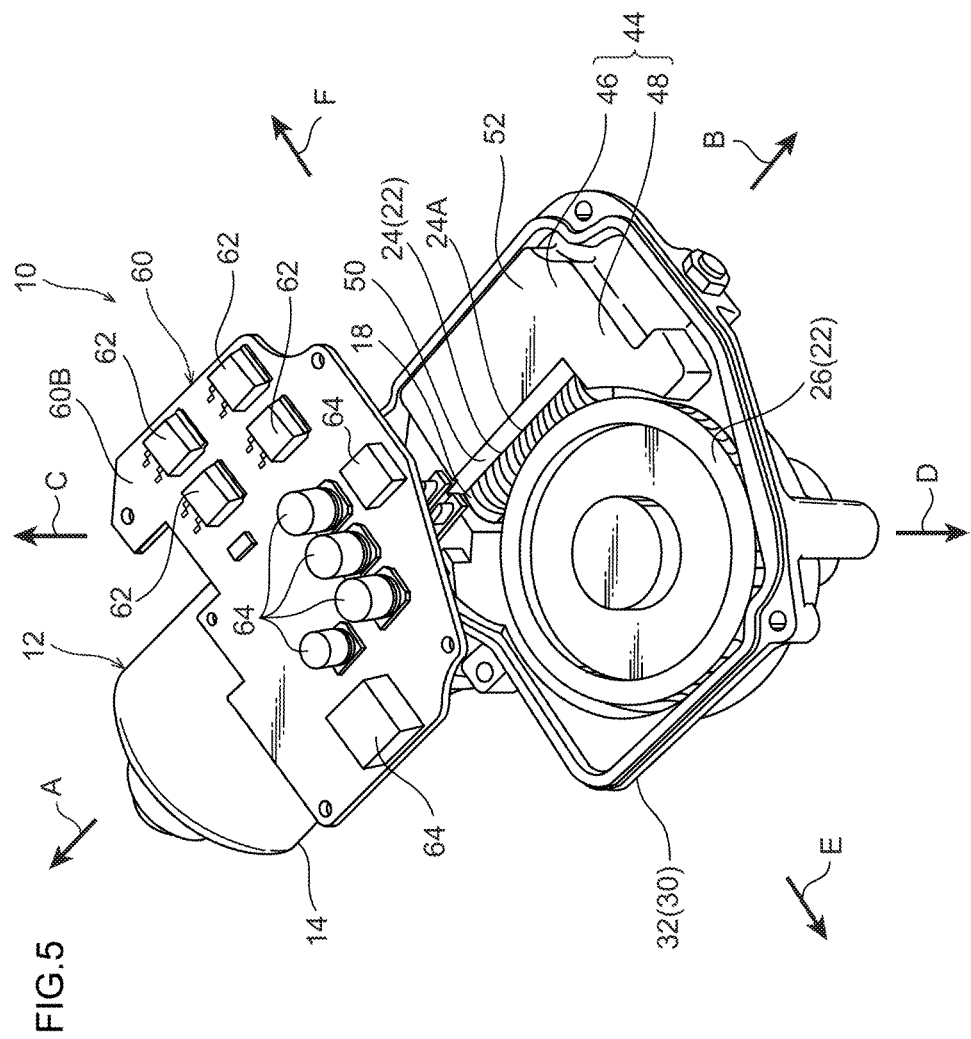
FIG. 5 is an exploded perspective view of the motor with a speed reducer that is shown in FIG. 1.

As is shown in FIG. 5 and FIG. 6, a heat dissipation block 44 in a substantial block shape is formed integrally at the gear housing 32. As viewed from the opening side of the gear housing 32 (the side in the direction of arrow C in FIG. 1, etc.), the heat dissipation block 44 is disposed adjacent to the worm accommodation portion 38 (the worm 24) at the opposite side from the side thereof at which the worm wheel accommodation portion 40 (the worm wheel 26) is disposed. Moreover, the heat dissipation block 44 is formed substantially in an inverted "L" shape. Specifically, as viewed from the opening side of the gear housing 32, the heat dissipation block 44 includes a block main body portion 46 and a block projection portion 48. The block main body portion 46 is formed in a substantially rectangular shape, the longest direction of which is in the axial direction of the rotary shaft 18. The block projection portion 48 is projected from one end portion of the block main body portion 46 toward the side thereof at which the worm wheel 26 is disposed. A bearing, which is not shown in the drawings, is provided at the block projection portion 48. The axial direction other end portion of the rotary shaft 18 is turnably supported by this bearing.

As shown in FIG. 1, an overhang portion 50 is integrally formed at a part of the block main body portion 46 that is disposed at the side thereof where the opening of the gear housing 32 is disposed. The overhang portion 50 is projected (protruded) from the block main body portion 46 toward the side thereof where the worm accommodation portion 38 is disposed, so as to cover the worm accommodation portion 38 from the side thereof where the opening of the gear housing 32 is disposed. The overhang portion 50 extends along the axial direction of the rotary shaft 18. Thus, portions of an inner periphery face of the worm accommodation portion 38 are structured by the block main body portion 46 and the overhang portion 50, and the worm 24 and the overhang portion 50 are disposed to overlap as viewed from the opening side of the gear housing 32. More specifically, the overhang portion 50 is formed to protrude above the worm 24 in the state in which the worm has been assembled, from a side wall of the worm accommodation portion 38 where the block main body portion 46 is disposed to an outer periphery portion of the worm wheel 26 which has been assembled. In other word, the projection amount of the overhang portion 50 is specified such that the worm wheel 26 does not interfere with the overhang portion 50 when the worm wheel 26 is being accommodated into the worm wheel accommodation portion 40.

Surfaces of the heat dissipation block 44 and the overhang portion 50 at the opening side of the gear housing 32 are disposed at one side in the axial direction of the worm wheel 26 (the opening side of the gear housing 32) relative to the worm 24, and are formed along directions orthogonal to the axial direction of the worm wheel 26. That is, the surfaces of the heat dissipation block 44 and the overhang portion 50 at the opening side of the gear housing 32 are formed to be coplanar, and these surfaces serve as a heat-receiving surface 52 that serves as a heat-receiving portion.

Figure 3:
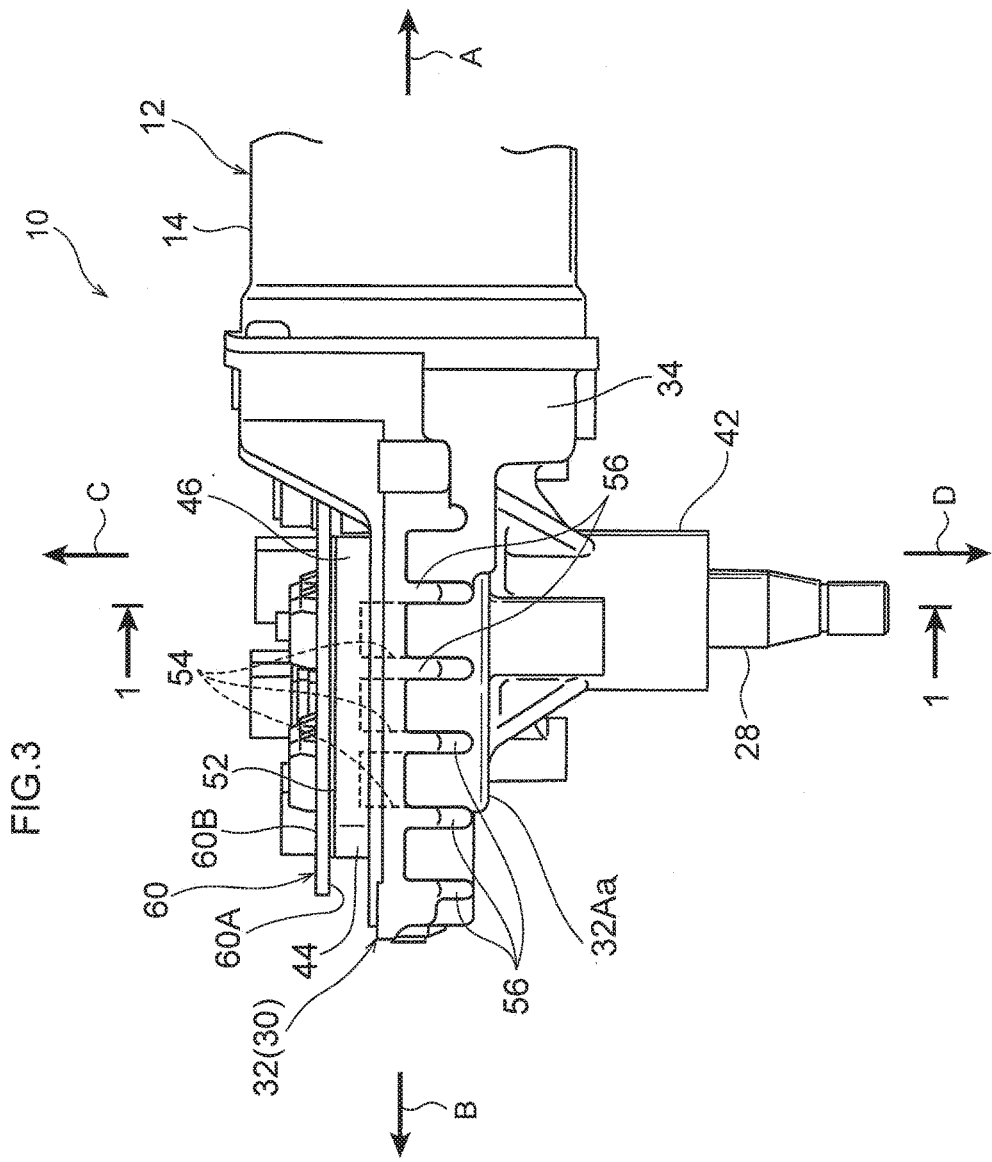
FIG. 3 is a side view showing the motor with a speed reducer that is shown in FIG. 1.

As shown in FIG. 3 and FIG. 4, plural recess portions 54 are formed in a region of the outer surface of the gear housing 32, at positions corresponding with the heat dissipation block 44. The recess portions 54 are recessed so as to be deeply hollowed toward the interior of the heat dissipation block 44 from the outer side face of the gear housing 32. The recess portions 54 open toward the other side in the axial direction of the worm wheel 26 (the side in the direction of arrow D in FIG. 4). Heat dissipation fins 56 are formed standing from the outer side face of the gear housing 32, adjacent to the recess portions 54 (so as to sandwich the recess portions 54). More specifically, the recess portions 54 and the heat dissipation fins 56 are formed to be continuous such that side faces of the recess portions 54 and side faces of the heat dissipation fins 56 are in the same planes. Thus, the plural heat dissipation fins 56 are formed integrally at positions of the region of the outer surface of the gear housing 32 that are adjacent to the recess portions 54. The heat dissipation fins 56 are formed in substantially trapezoid shapes, and are spaced at predetermined intervals in the axial direction of the rotary shaft 18 with plate thickness directions thereof in the axial direction of the rotary shaft 18. Proximal end portions of the heat dissipation fins 56 are disposed inside the heat dissipation block 44, and distal end portions of the heat dissipation fins 56 are disposed at the one side in the axial direction of the worm wheel 26 relative to an outer side surface 32Aa of the floor wall 32A of the gear housing 32. That is, the distal end portions of the heat dissipation fins 56 are structured so as to protrude beyond the outer side surface 32Aa of the floor wall 32A of the gear housing 32 in a side view.

Meanwhile, as shown in FIG. 4, the cover plate 58 is fabricated of a resin material with insulative properties, and is disposed at the opening side of the gear housing 32. The cover plate 58 is formed substantially in the shape of a cuboid box that is open to the side thereof at which the gear housing 32 is disposed, and the cover plate 58 closes off the opening of the gear housing 32.

As shown in FIG. 1, FIG. 3 and FIG. 5, the circuit board 60 is accommodated inside the housing 30. The circuit board 60 is formed in a substantially rectangular plate shape, and is disposed with the plate thickness direction thereof in the axial direction of the worm wheel 26. More specifically, a portion of a lower face 60A (an other side face) of the circuit board 60 is disposed in correspondence with the heat-receiving surface 52 of the heat dissipation block 44. The circuit board 60 is fixedly assembled by screws or the like to the heat-receiving surface 52 of the heat dissipation block 44, so as to cover the worm wheel 26 and the worm 24 from the side thereof at which the opening of the gear housing 32 is disposed. That is, in the motor with a speed reducer 10 according to the present exemplary embodiment, the circuit board 60 is structured by a single board in a planar configuration.

The circuit board 60 includes power components 62, such as field effect transistors or the like for controlling driving of the motor main body 12, and control components 64, such as a CPU, a rotation sensor, memory and the like that control rotation of the rotary shaft 18 (and the output shaft 28). The power components 62 and the control components 64 are disposed at an upper face 60B (a one side face) of the circuit board 60. The power components 62 are disposed at positions that correspond with the heat-receiving surface 52 of the heat dissipation block 44. That is, as viewed from the opening side of the gear housing 32, the power components 62 are disposed at positions that overlap with the heat-receiving surface 52 of the heat dissipation block 44, which is to say positions that correspond with the heat-receiving surface 52 of the heat dissipation block 44. The circuit board 60 is electrically connected to the armature 16 via the brush holder apparatus 20 of the motor main body 12. Thus, driving of the motor main body 12 is controlled by the circuit board 60 and rotation of the rotary shaft of the motor main body 12 is controlled by the circuit board 60, as a result of which rotation of the output shaft 28 of this motor with a speed reducer is controlled.

A thermally conductive adhesive 66 (see FIG. 1) that serves as a thermally conductive material is interposed between the lower face 60A of the circuit board 60 and the heat-receiving surface 52. The thermally conductive adhesive 66 is a clay-type adhesive with viscosity and thermal conductivity. Thus, the heat-receiving surface 52 and the lower face 60A of the circuit board 60 are put into area contact by the thermally conductive adhesive 66.

Now, operation and effects of the present exemplary embodiment are described.

In the motor with a speed reducer 10 that is structured as described above, the circuit board 60 for controlling driving and rotation of the motor main body 12 is accommodated in the housing 30. The circuit board 60 is disposed with the plate thickness direction thereof in the axial direction of the worm wheel 26, and the power components 62 that control driving of the motor main body 12 are disposed on the upper face 60B of the circuit board 60.

The heat dissipation block 44 and the overhang portion 50 are formed integrally at the gear housing 32, and the surfaces of the heat dissipation block 44 and the overhang portion 50 at the side thereof at which the opening of the gear housing 32 is disposed serve as the heat-receiving surface 52. The lower face 60A of the circuit board 60 opposes and is disposed on the heat-receiving surface 52. Thus, heat generated by the power components 62 of the circuit board 60 is received by the heat-receiving surface 52, and this heat is transferred to the gear housing 32.

As viewed from the opening side of the gear housing 32, a portion of the heat-receiving surface 52 (the overhang portion 50) is disposed to overlap with the worm 24. Therefore, as viewed from the opening side of the gear housing 32, the surface area of the heat-receiving surface 52 may be specified to be larger than in a comparative example in which the overhang portion 50 is omitted. That is, compared with this comparative example, a surface area of the heat-receiving surface 52 that corresponds with the lower face 60A of the circuit board 60 may be made larger without the exterior of the gear housing 32 (at the side in the direction of arrow F in FIG. 1) becoming larger. Thus, while an increase in size of the gear housing 32 may be suppressed, heat generated by the power components 62 may be effectively received by the heat-receiving surface 52 and this heat may be dissipated from the gear housing 32.

As viewed from the opening side of the gear housing 32, the power components 62 are disposed to overlap with the heat-receiving surface 52. Therefore, heat generated by the power components 62 may be efficiently transferred to the heat-receiving surface 52.

The gear housing 32 is fabricated of aluminum (or an aluminum alloy) with good thermal conductivity, and the heat-receiving surface 52 is formed integrally with the gear housing 32. Therefore, the heat received by the heat-receiving surface 52 may be efficiently transferred to the gear housing 32 with good thermal conductivity, and this heat may be dissipated to the outer side of the gear housing 32.

The heat-receiving surface 52 forms a flat surface that is parallel with the circuit board 60. Therefore, the power components 62 that are disposed in a planar configuration at the upper face 60B of the circuit board 60 may be easily disposed to correspond with the heat-receiving surface 52.

As viewed from the opening side of the gear housing 32, the heat dissipation block 44 is disposed at the opposite side from a side of the worm 24 where the worm wheel 26 is disposed. Meanwhile, the overhang portion 50 is disposed at the opening side of the gear housing 32 relative to the worm 24, and protrudes from the heat dissipation block 44 toward the worm 24 is disposed. Thus, the heat dissipation block 44 and overhang portion 50 may be formed to effectively utilize dead space in the gear housing 32, and the heat-receiving surface 52 may be formed with a large surface area at the heat dissipation block 44 and overhang portion 50.

The lower face 60A of the circuit board 60 and the heat-receiving surface 52 need not touch directly, and it is preferable if the thermally conductive adhesive 66 is interposed between the lower face 60A and the heat-receiving surface 52. Thus, the lower face 60A of the circuit board 60 and the heat-receiving surface 52 may be put into area contact over the shape of the contact region therebetween. Thus, the efficiency of heat conduction from the circuit board 60 to the heat-receiving surface 52 may be further improved.

The recess portions 54 are formed in the region of the outer surface portion of the gear housing 32 that corresponds with the heat dissipation block 44, and the recess portions 54 are recessed so as to be deeply hollowed from the outer surface portion of the gear housing 32 toward the interior of the heat dissipation block 44. Accordingly, the heat dissipation fins 56 are formed adjacent to the recess portions 54 at the outer surface portion of the gear housing 32. Because the proximal end portions of the heat dissipation fins 56 are disposed at the interior of the heat dissipation block 44, the surface area of the heat dissipation fins 56 may be formed to be larger while protrusion of the heat dissipation fins 56 from the outer surface portion of the gear housing 32 may be suppressed. Thus, heat transferred to the gear housing 32 may be effectively dissipated from the heat dissipation fins 56 while an increase in size of the gear housing 32 may be suppressed. Furthermore, because the recess portions 54 are formed to be deeply hollowed to the interior of the heat dissipation block 44, an amount of material of the gear housing 32 may be reduced. Thus, material costs may be reduced and weight may be reduced.

In the present exemplary embodiment, the heat dissipation block 44 and overhang portion 50 are structured integrally with the gear housing 32. However, the heat dissipation block 44 and overhang portion 50 may be structured as a separate body from the gear housing 32, and the heat dissipation block 44 and overhang portion 50 that are structured as a separate body may be assembled to the gear housing 32. In this case, the heat dissipation fins 56 may be formed at the heat dissipation block 44 that is a separate body, in which case dissipation surfaces of the recess portions 54 of the heat dissipation block 44 (the outer side surface of the gear housing 32) and dissipation surfaces of the heat dissipation fins 56 may be formed respectively separately.

In the present exemplary embodiment, the power components 62 are disposed to overlap with the heat-receiving surface 52 as viewed from the opening side of the gear housing 32. However, just a portion of the power components 62 may be disposed to overlap with the heat-receiving surface 52.

In the present exemplary embodiment, the thermally conductive adhesive 66 is interposed between the lower face 60A of the circuit board 60 and the heat-receiving surface 52. However, the thermally conductive adhesive 66 may be omitted.

Moreover, although the motor main body 12 is configured as a brushed DC motor, the motor main body 12 may be configured as a brushless motor.

In the present exemplary embodiment, the motor with a speed reducer 10 is employed at a wiper device of a vehicle. However, the motor with a speed reducer 10 may be employed at alternative devices. For example, the motor with a speed reducer 10 may be employed at a power window device, a sunroof device or a power seat device of a vehicle (an automobile), or the like.

What is claimed is:

1. A motor with a speed reducer, comprising:
  a motor main body including a rotary shaft;
  a speed reducer portion including a worm that is provided at the rotary shaft and a worm wheel that meshes with the worm, the speed reducer portion reducing a rotation speed of the rotary shaft;
  a housing including a housing main body and a housing cover, the housing main body accommodating the speed reducer portion and being open to one side in an axial direction of the worm wheel, and the housing cover closing off an opening of the housing main body;
  a circuit board that is accommodated in the housing with a plate thickness direction of the circuit board in the axial direction of the worm wheel, a power component that controls driving of the motor main body being disposed at a face at one side of the circuit board;
  a heat dissipation block formed integrally with the housing main body, wherein, from a top view looking down onto those sides of the worm wheel, worm and heat dissipation block that are closest to the printed circuit board, the heat dissipation block is located laterally between a first side of the worm and an outer edge of housing main body, and the worm wheel is located at a second side of the worm that is opposite to the first side, such that the worm is located laterally between, and adjacent to both of, the worm wheel and at least a portion of the heat dissipation block; and
  a heat-receiving portion that is a surface of the heat dissipation block, the heat-receiving portion being adjacent to the worm and disposed such that a part of the heat-receiving portion overlaps with the worm as viewed from the side of the heat-receiving portion at which the opening of the housing main body that is closed off by the housing cover is disposed, and the heat-receiving portion touching against a face at the other side of the circuit board and receiving heat generated by the power component,
  wherein the heat-receiving portion is disposed together with the worm, the worm wheel, and the circuit board inside a single space that is formed by the housing main body and the housing cover,
  wherein at least one heat dissipation fin extends from an outer surface portion of the housing main body, and a proximal end portion of the at least one heat dissipation fin is disposed at an interior of the heat dissipation block, and wherein the at least one heat dissipation fin receives heat from the heat-receiving portion via the heat dissipation block, and dissipates the heat outside the housing main body.

2. The motor with a speed reducer according to claim 1, wherein the power component is disposed to overlap with the heat-receiving portion as viewed from the side of the power component where the opening of the housing main body is disposed.

3. The motor with a speed reducer according to claim 1, wherein the housing main body is fabricated of metal and the heat-receiving portion is formed integrally with the housing main body.

4. The motor with a speed reducer according to claim 1, wherein the heat-receiving portion forms a flat surface that is parallel with the circuit board, and the flat surface opposes the face at the other side of the circuit board.

5. The motor with a speed reducer according to claim 1, wherein the at least one heat dissipation fin is formed integrally at an outer surface portion of the housing main body, at a position that corresponds with the heat-receiving portion.

6. The motor with a speed reducer according to claim 1, wherein the face at the other side of the circuit board and the heat-receiving portion touch via a viscous thermally conductive material.

7. The motor with a speed reducer according to claim 1, wherein an overhang portion is formed at the heat dissipation block, at a position of the heat dissipation block where the opening of the housing main body is disposed relative to the worm, the overhang portion protruding toward the worm, and surfaces of the heat dissipation block and the overhang portion at the side of the heat dissipation block where the opening of the housing main body is disposed are formed to be coplanar and structure the heat-receiving portion.

8. The motor with a speed reducer according to claim 7, wherein the overhang portion of the heat dissipation block overlaps with a portion of the worm as viewed from the side of the heat dissipation block where the opening of the housing main body is disposed.

9. The motor with a speed reducer according to claim 7, wherein a plurality of recess portions are provided from the outer surface portion of the housing main body to the interior of the heat dissipation block, and the heat dissipation fins are formed adjacent to the recess portions, respectively.

10. A motor with a speed reducer, comprising:
a motor main body including a rotary shaft;
a speed reducer portion including a worm that is provided at the rotary shaft and a worm wheel that meshes with the worm, the speed reducer portion reducing a rotation speed of the rotary shaft;
a housing including a housing main body and a housing cover, the housing main body accommodating the speed reducer portion and being open to one side in an axial direction of the worm wheel, and the housing cover closing off an opening of the housing main body;
a circuit board that is accommodated in the housing with a plate thickness direction of the circuit board in the axial direction of the worm wheel, a power component that controls driving of the motor main body being disposed at a face at one side of the circuit board;
a heat dissipation block that is formed integrally inside the housing main body, wherein, from a top view looking down onto those sides of the worm wheel, worm and heat dissipation block that are closest to the printed circuit board, the heat dissipation block is located laterally between a first side of the worm and an outer edge of housing main body, and the worm wheel is located at a second side of the worm that is opposite to the first side, such that the worm is located laterally between, and adjacent to both of, the worm wheel and at least a portion of the heat dissipation block, and wherein the heat dissipation block is disposed to overlap with the power component, as viewed from the side of the power component at which the housing main body is disposed, and the heat dissipation block receives heat generated by the power component;
a plurality of recess portions that are formed at a region of an outer surface portion of the housing main body that corresponds with the heat dissipation block, the recess portions being recessed from the outer surface portion of the housing main body to the interior of the heat dissipation block in the plate thickness direction of the circuit board; and
a plurality of heat dissipation fins that extend from the outer surface portion of the housing main body, the heat dissipation fins being formed adjacent to the recess portions such that the heat dissipation fins are disposed alternately with the recess portions,
wherein proximal end portions of the heat dissipation fins are disposed inside the heat dissipation block and the heat dissipation fins receive heat from the heat-receiving portion via the heat dissipation block, and dissipate the heat outside the housing main body.

11. The motor with a speed reducer according to claim 10, wherein the face at the other side of the circuit board and the heat dissipation block touch via a viscous thermally conductive material.

12. The motor with a speed reducer according to claim 10, wherein a contact portion between the heat dissipation block and the face at the other side of the circuit board is a heat-receiving portion, and the heat-receiving portion forms a flat surface that is parallel with the circuit board.

13. The motor with a speed reducer according to claim 12, wherein an overhang portion is formed at the heat dissipation block, at a position of the heat dissipation block where the opening of the housing main body is disposed relative to the worm, the overhang portion protruding toward the worm, and surfaces of the heat dissipation block and the overhang portion at the side of the heat dissipation block where the opening of the housing main body is disposed are formed to be coplanar and structure the heat-receiving portion.

* * * * *